Figure 1:
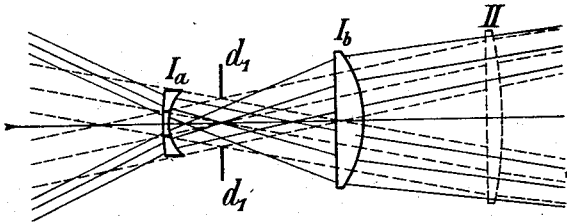

A. KÖNIG.
VARIABLE POWER TELESCOPE.
APPLICATION FILED MAY 2, 1912.

1,094,724.        Patented Apr. 28, 1914.

Witnesses:
Paul Krüger
Richard Hahn

Inventor:
Albert König

UNITED STATES PATENT OFFICE.

ALBERT KÖNIG, OF JENA, GERMANY, ASSIGNOR TO THE FIRM OF CARL ZEISS, OF JENA, GERMANY.

VARIABLE-POWER TELESCOPE.

1,094,724. Specification of Letters Patent. Patented Apr. 28, 1914.

Application filed May 2, 1912. Serial No. 694,712.

*To all whom it may concern:*

Be it known that I, ALBERT KÖNIG, a citizen of the German Empire, residing at Jena, Germany, have invented a new and useful Variable-Power Telescope, of which the following is a specification.

The invention relates to telescopes having two different powers and more particularly to those, in which the change of power is brought about by two objectives, which both form real images of distant objects, but have different focal lengths, being exchanged the one for the other without being uncoupled from the telescope casing. As for practical reasons the operative position of the one objective must approximately coincide with that of the other, the locus of the image experiences, on the two objectives being exchanged, a greater or less displacement, according as the focal lengths of the objectives more or less differ, which displacement necessitates a corresponding shifting of the ocular. Such a shifting of the ocular is done away with through adopting the present invention.

This invention consists in one of the two objectives being composed of two (separate) members in such a manner that the locus of the image formed by it coincides with the locus of the image of the other objective in spite of the difference between the focal lengths of the two objectives. For this purpose such an objective consisting of two members (or double-member objective) must be made up of a collective member of greater and a dispersive member of smaller focal length. When the collective member is placed in front, the focal length of the objective is greater, and when the dispersive member is placed in front, the focal length is smaller than that of the ordinary single-member objective having the same image-locus and approximately the same operative position. In order to obtain a considerable difference of the two focal lengths and thereby of the two powers of the telescope, it is convenient to choose as the other objective as well one of the double-member kind already described, but having its members in the reversed order. A third intermediate objective focal length may also be made available (while retaining in accordance with the invention the locus of the image), by disposing a third objective, but of the ordinary single-member construction, in such a manner as to be exchangeable for the first and the second objective.

When the invention is to be applied to telescopes having a low power and a correspondingly large field of vision, small lens dimensions may be obtained for the double-member objectives, when the crossing of the pencils occurs between the members. A position of the entrance pupil, corresponding to this condition, may be realized in several ways: directly by means of a diaphragm at the place, where the crossing is to occur, indirectly either by limiting the aperture of the image-forming pencils near the inverting lens system or, when no such system is employed, by means of a diaphragm behind the ocular. The last mentioned diaphragm may also be replaced by the eye of the observer, if the said eye be given the correct location by means of the shell-piece of the ocular.

In telescopes furnished with an objective reflector or with a corresponding prism it will be convenient to dispose the objectives in such a manner that, on the latter being exchanged the one for the other, the reflector can retain its position. A double-member objective then receives such an operative position that its front member lies in front of and its hinder member behind the reflector. The objectives may be fitted in a common mount. The best way of effecting this is to so arrange this mount that it surrounds the objective reflector in the principal reflecting plane and is rotatable in this plane for the purpose of exchanging the objectives.

Figure 2:
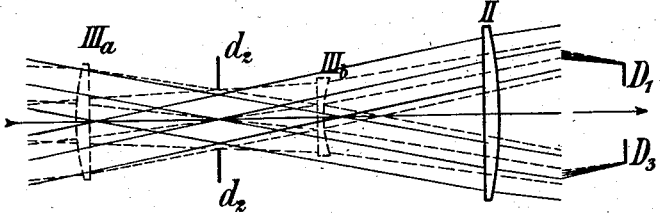
Figure 3:
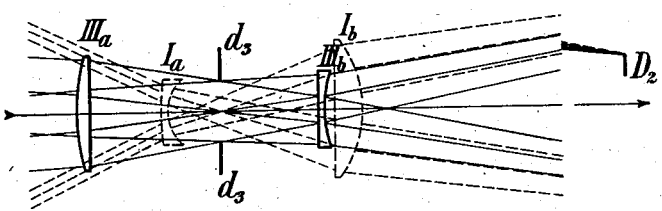
Figure 4:
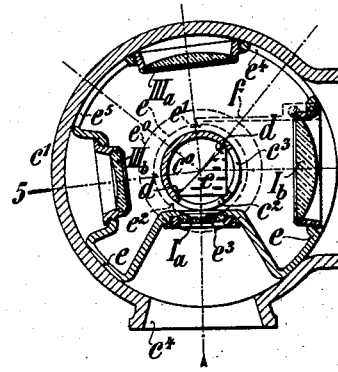
Figure 5:
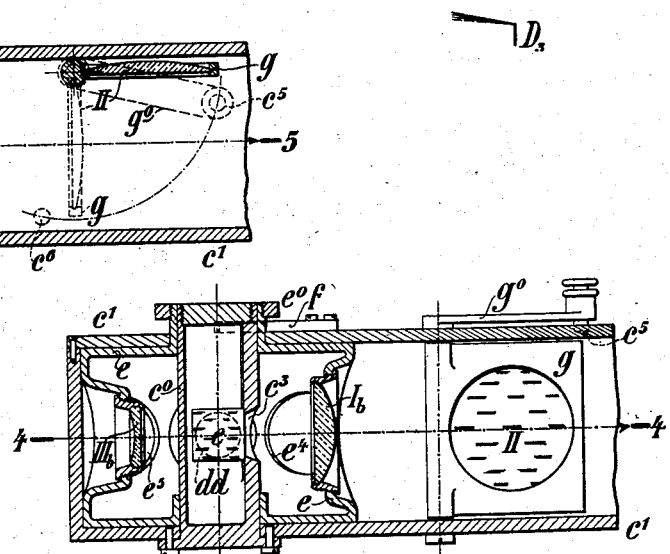

In the annexed drawing: Figure 1 shows the path of the rays in one of the double-member objectives according to the invention. Fig. 2 shows the path of the rays in the single-member objective. Fig. 3 shows the path of the rays in the other double-member objective. Fig. 4 is an axial section through the objective end of a telescope constructed according to the invention. Fig. 5 is another such view at right angles to that of Fig. 4.

The first three figures of the drawing correspond to the three cases, which arise, when the invention is carried out with only two objectives. In these figures both objectives are in the operative position; that one shown by dotted lines is only to occupy this position after the other one has been made inoperative. The image-locus of both objectives for very distant objects is indicated in each figure by the diaphragm D D of the field of vision, the locus, in which the pencils cross one another, by a diaphragm d d. The pencils, which correspond to the margin of the field of vision, are each shown by means of the principal ray and the two marginal rays. They are also indicated for the dotted objective, but in dotted lines.

In Fig. 1 to the objective consisting of the dispersive front member $I_a$ and the collective hinder member $I_b$, an ordinary objective consisting of a single member II is added. In Fig. 2 to this single-member objective there is added another double-member objective composed of a collective front member $III_a$ and a dispersive hinder member $III_b$. In Fig. 3 to this latter double-member objective $III_a$, $III_b$ the first one $I_a$, $I_b$ is added.

The relative position of the members of the objectives in the three figures corresponds to the following numerical example:

*Numerical example.*—Given that $I_a$ has the focal length —30 and $I_b$ the focal length 61, and that the distance between the two is 50, then the focal length of the double-member objective is about 100 and the distance from the hinder member to the diaphragm of the field of vision about 265. The objective II then receives the focal length 220. The member $III_a$ is given the focal length 150 and $III_b$ the focal length —118, so that for a distance 67 between these members there results about 500 as the focal length of the double-member objective and 275 as the distance of its hinder member from the diaphragm of the field of vision.

In Figs. 4 and 5 an objective reflecting prism $c$ diverts the axis of the entering rays by 90°. An elliptical diaphragm d d is disposed on its hypotenusal surface, while the inner part of this surface is totally reflecting. All three objectives, viz. $I_a$, $I_b$, the single objective II and $III_a$, $III_b$ are exchangeable the one for the other. For this purpose the mount $c°$ of the prism $c$ is formed as a journal, which is rigidly connected with the telescope casing $c^1$ and stands perpendicularly on the plane of the ray axes (the principal reflecting plane). In this journal-shaped prism-mount $c°$ two openings $c^2$ and $c^3$ are provided for the entrance and the exit of the rays. On the journal $c°$ a drum $e$ is rotatably mounted. This drum projects out of the casing $c^1$ at one journal-end only and is there provided with a small hand-wheel $e°$. Opposite the entrance opening $c^2$ of the prism-mount $c°$ an entrance opening $c^4$ is provided in the telescope casing $c^1$ as well. The two double-member objectives $I_a$, $I_b$ and $III_a$, $III_b$ are fitted in the drum $e$, their members being placed perpendicularly to each other corresponding to the deflection of the axis of the rays by the prism $c$ through 90°. The objective $I_a$, $I_b$ is in its operative position. A spring $f$ secures the drum $e$ against being accidentally rotated, by engaging in the first of the series of notches $e^1$, $e^2$, $e^3$ arranged on the neck of the drum. On the drum $e$ being rotated by means of the small hand-wheel $e°$ in one direction or the other, until the spring $f$ engages in the notch $e^3$, the front member $III_a$ comes to rest opposite the entrance opening $c^2$ and the hinder member $III_b$ opposite the entrance opening $c^3$ of the prism-mount $c°$. When on the other hand the drum $e$ is set to the notch $e^2$, the two openings $e^4$ and $e^5$ of the drum are made available. The objective II, which is disposed outside the drum $e$ in the casing $c^1$, must then be turned into the operative position shown by dotted lines, for which purpose the mount $g$ of this objective is journaled in the casing $c^1$ and provided with a setting-lever $g°$, which can engage two notches $c^5$, $c^6$ in the casing $c^1$.

I claim:

1. In a telescope a plurality of objectives, having different focal lengths and forming real images, and means for bringing the said objectives alternately into approximately the same operative locus without detaching them from the telescope casing, one objective being composed of a collective front member of greater and a dispersive hinder member of smaller focal length and the other objective being composed of a dispersive front member of smaller and a collective hinder member of greater focal length.

2. In a telescope three objectives, each forming a real image, and means for bringing the said objectives alternately into approximately the same operative locus without detaching them from the telescope casing, one of these objectives being composed of a collective front member of greater and a dispersive hinder member of smaller focal length, another objective consisting of a single member, the focal length of which is smaller than that of the first objective, and the third objective being composed of a dispersive front member of smaller and a collective hinder member of greater focal length and the focal length of this third objective being smaller than that of the second objective.

ALBERT KÖNIG.

Witnesses:
 PAUL KRÜGER,
 RICHARD HELM.

---

Copies of this patent may be obtained for five cents each, by addressing the "Commissioner of Patents, Washington, D. C."